United States Patent [19]

Kohlhammer et al.

[11] Patent Number: 5,304,609
[45] Date of Patent: Apr. 19, 1994

[54] GRAFT COPOLYMERS HAVING IMPROVED PHASE BINDING BETWEEN THE GRAFT BASE AND THE GRAFTED-ON POLYMER PHASE

[75] Inventors: Klaus Kohlhammer, Marktl; Hermann Petersen, Burghausen; Walter Dobler, Tann, all of Fed. Rep. of Germany

[73] Assignee: Wacker Chemie GmbH, Munich, Fed. Rep. of Germany

[21] Appl. No.: 967,662

[22] Filed: Oct. 28, 1993

[30] Foreign Application Priority Data

Oct. 31, 1991 [DE] Fed. Rep. of Germany ....... 4135984

[51] Int. Cl.$^5$ ............................................ C08F 263/04
[52] U.S. Cl. ................................. 525/309; 526/322; 560/205
[58] Field of Search ......................................... 525/309

[56] References Cited

U.S. PATENT DOCUMENTS 4,954,656  9/1990  Suyama et al. ..................... 568/567
5,041,624  8/1991  Suyama et al. ..................... 526/232

FOREIGN PATENT DOCUMENTS 0277608  8/1988  European Pat. Off. .
0295821  12/1988  European Pat. Off. .

*Primary Examiner*—Vasu S. Jagannathan
*Attorney, Agent, or Firm*—Burgess, Ryan and Wayne

[57] ABSTRACT

Graft copolymers having improved phase binding between the graft base and the grafted-on polymer, are prepared from:
a) a grafted-on polymer phase containing one or more monomers from the group consisting of (meth)acrylates of alcohols having 1 to 10 carbon atoms, vinyl esters of saturated aliphatic carboxylic acids having 2 to 10 carbon atoms, olefins, vinyl halides, styrene and styrene derivatives, and
b) a peroxy group-containing copolymer phase containing from 0.01 to 20% by weight of an olefinically unsaturated peroxy compound of the general formula I or II

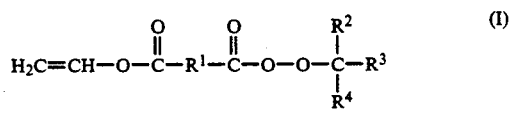

or

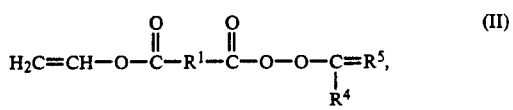

where $R^1$ is a chemical bond or a linear or branched alkyl chain having 1 to 10 carbon atoms or a cycloalkyl group having 3 to 10 carbon atoms, $R^2$ and $R^3$ are an alkyl group having 1 to 4 carbon atoms, $R^4$ is an alkyl group or an alkyl-substituted phenyl group having 3 to 12 carbon atoms, and $R^5$ is a cycloalkyl group having 3 to 12 carbon atoms, and from 80 to 99.9% by weight of one or more comonomers from the group consisting of the (meth)acrylates of alcohols having 1 to 10 carbon atoms, vinyl esters of saturated aliphatic carboxylic acids having 2 to 10 carbon atoms, olefins, vinylaromatic compounds, vinyl halides and/or vinyl ethers.

The graft copolymers are useful as binders in the textile industry as heat stable binders, as adhesives in plasters and as binders in emulsion paints.

3 Claims, No Drawings

GRAFT COPOLYMERS HAVING IMPROVED PHASE BINDING BETWEEN THE GRAFT BASE AND THE GRAFTED-ON POLYMER PHASE

BACKGROUND OF THE INVENTION

1) Field of the Invention

The invention relates to graft copolymers having improved phase binding between the graft base and the grafted-on polymer phase, to the peroxy group-containing copolymers on which these are based, and to copolymerizable peroxy monovinyl esters. The invention furthermore relates to processes for the preparation of said polymers and peroxy compounds.

2) Background Art

Copolymerizable initiators offer interesting opportunities in the preparation of novel polymeric materials. By means of such initiators, potential free-radical functions which function as defined anchor groups in the preparation of graft and block copolymers, are introduced into polymer chains. One area of application is, for example, the phase coupling of incompatible polymers in core/shell latices during the preparation thereof by the emulsion polymerization process.

Peroxy carbonates containing an allylic double bond and the use thereof as comonomers in copolymerization with further ethylenically unsaturated monomers are described in DE-A 2726008. German Patent 3420048 relates to copolymers of vinyl acetate and peroxyallyl carbonates and the use thereof as sizing agents for glass fibers. It is disadvantageous that these allyl-functional peroxy carbonates only copolymerize very slowly, if at all, with other vinyl monomers.

EP-A 277608 (U.S. Pat. No. 4,879,347) and EP-A 279430 (U.S. Pat. No. 4,839,432) describe copolymerizable peroxy carbonates containing (meth) acrylate and allyl ether functions as comonomers for improving the phase binding in the preparation of polymer blends. The peroxy carbonate is polymerized here with vinyl monomers in the presence of an ethylene copolymer by the suspension polymerization process. On heating of the mixture, coupling of the two polymer phases takes place via the peroxy functions. U.S. Pat. No. 4,923,956 describes a procedure which is analogous to EP-A 279430, with the difference that propylene polymers are employed instead of the ethylene polymers. EP-A 307802 relates to mixtures of polypropylene, a further polymer and copolymer made from a vinyl monomer and a peroxy carbonate containing an allyl ether or (meth) acrylate function; the phase binding thereof being improved by heating to temperatures of from 200° to 300° C. EP-B 225091 describes allyl ether-substituted peroxy dicarbonates used as initiators for the preparation of high-molecular-weight, branched VC polymers. The above-mentioned copolymerizable peroxy esters, in particular the allyl compounds, have the disadvantage of low reactivity on copolymerization with other vinyl monomers. Further more, said peroxy esters can only initiate further free-radical reactions from temperature $\geq 130°$ C. and are thus of no interest for emulsion polymerization.

The known methylstyrene-based peroxy compound discussed by W. C. Endstra in Kautschuk und Gummi, Kunststoffe 42(5), 414 (1989) has the disadvantage that it cannot be copolymerized with many vinyl monomers, and further free-radical reactions are only initiated thermally from temperatures $\geq 160°$ C. The same applies to tert.-butyl-peroxy (p-(vinylbenzoyl) benzoates (I. Gupta, S. N. Gupta, D. C. neckers, J. Polym. Sci.: Polym. Chem Ed. 20, 147 (1982), which only thermally initiate further free-radical reactions from T$\geq 100°$ C. and thus cannot be employed for copolymerization by the emulsion polymerization process.

The object was therefore to provide olefinically unsaturated peroxy compounds which are copolymerizable with ethylenically unsaturated monomers whose peroxy group is retained during the copolymerization and whose peroxy groups, after incorporation into the copolymer, are able to initiate further free-radical polymerization reactions at temperatures $\leq 100°$. A further object was to provide these peroxy compound-containing copolymers and the graft copolymers based on the peroxy group-containing copolymers.

Surprisingly, we have found that this object is achieved by means of peroxy monovinyl esters of aliphatic dicarboxylic acids and copolymers or graft copolymers containing these peroxy compounds.

SUMMARY OF THE INVENTION

The invention relates to peroxy monovinyl esters of aliphatic dicarboxylic acids having the general formula I or II

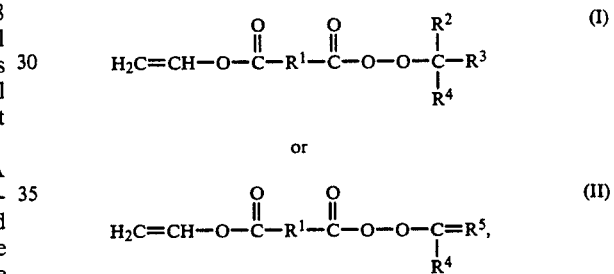

where $R^1$ is a chemical bond or a linear or branched alkyl chain having 1 to 10 carbon atoms or a cycloalkyl group having 3 to 10 carbon atoms; $R^2$ and $R^3$ are an alkyl group having 1 to 4 carbon atoms, $R^4$ is an alkyl group or an alkyl-substituted phenyl group having 1 to 12 carbon atoms or a cycloalkyl group having 3 to 12 carbon atoms, and $R^5$ is a cycloalkyl group having 3 to 12 carbon atoms. Examples of these are t-butylperoxy monovinyl esters, t-amylperoxy monovinyl esters, the cumylperoxy monovinyl esters and the pinylperoxy monovinyl esters of oxalic acid, malonic acid, succinic acid, glutaric acid, adipic acid, pimelic acid, suberic acid, azelaic acid and sebacic acid.

Preference is given to compounds of the formula I in which $R^1$ is $(CH_2)_n$ where $n=1$ to 4 and $n=8$, $R^2$ and $R^4$ are a methyl group, and $R^3$ is a methyl, ethyl or phenyl group; these compounds are the t-butylperoxy monovinyl esters, the t-amylperoxy monovinyl esters and the cumylperoxy monovinyl esters of malonic acid, succinic acid, glutaric acid, adipic acid and sebacic acid.

Particular preference is given to compounds of the formula I in which $R^1$ is $(CH_2)_n$ where n is 2 to 4 and $n=8$, and $R^2$, $R^3$ and $R^4$ are a methyl group; these compounds are the t-butylperoxy monovinyl esters of succinic acid, glutaric acid, adipic acid and sebacic acid. Greatest preference is given to t-butylperoxy monovinyl adipate.

DESCRIPTION OF THE PREFERRED EMBODIMENTS

The peroxy monovinyl dicarboxylates according to the invention are preferably prepared starting from the corresponding monovinyl dicarboxylates of the general formula $H_2C=CH-O-CO-R^1-COOH$ by esterification of the free acid group by means of the corresponding alkyl hydroperoxide of the general formula $CR^2R^3R^4-OOH$ or $R^5=CR^4-OOH$, where the radicals $R^1$, $R^2$, $R^3$, $R^4$ and $R^5$ are as defined above. Synthetic routes starting from the corresponding monovinyl dicarboxylic anhydrides or dicarboxylic acid halides are also conceivable.

In a particularly preferred embodiment, the esterification is carried out in the presence of dicyclohexylcarbodiimide (DCCD), the alkyl hydroperoxide and DCCD each being employed in a molar ratio of from 1:1 to 1:2, in each case based on the monovinyl dicarboxylate. In the most preferred embodiment, the monovinyl dicarboxylate, the alkyl hydroperoxide and the dicyclohexylcarbodiimide are employed in approximately equimolar ratios and reacted with one another at a temperature of from 0° to 40° C., if desired in the presence of an inert solvent such as diethyl ether.

The olefinically unsaturated peroxy compounds according to the invention are suitable for the preparation of copolymers which contain peroxide groups and behave as "macroinitiators" in the block or graft copolymerization. The free peroxide groups in the copolymer function as anchor groups in the graft copolymerization and thus improve the phase binding of incompatible polymer phases, for example in core/shell latices. However, the reaction conditions in the copolymerization for the preparation of the peroxide-containing copolymers must be selected so that the peroxide bond is not broken.

The invention furthermore relates to copolymers which contain the peroxy monovinyl esters of the formula I or II and to processes for their preparation. The peroxide group-containing copolymers contain between 0.01 and 20% by weight of the olefinically unsaturated peroxy compound according to the invention and from 80 to 99.9% by weight of one or more comonomers from the group consisting of the (meth)acrylates of alcohols having 1 to 10 carbon atoms, vinyl esters of saturated aliphatic carboxylic acids having 2 to 10 carbon atoms, olefins, vinylaromatic compounds, vinyl halides and/or vinyl ethers, the data in % by weight in each case being based on the total weight of the copolymer. The content of peroxy compound is preferably from 0.01 to 10% by weight, particularly preferably between 0.01 and 5% by weight.

Preferred base monomers are selected from the group consisting of the methacrylates or acrylates of alcohols having 1 to 10 carbon atoms, methyl methacrylate, methyl acrylate, ethyl methacrylate, ethyl acrylate, isopropyl methacrylate, isopropyl acrylate, tert.-butyl acrylate, n-butyl acrylate and ethylhexyl acrylate; from the group consisting of the vinyl esters of saturated aliphatic carboxylic acids having 2 to 10 carbon atoms, vinyl acetate, isopropenyl acetate, vinyl proprionate, vinyl laurate and vinyl esters of versatic$^R$ acid having 9 to 10 carbon atoms (vinyl esters of saturated α-branched monocarboxylic acids, commercial product from Shell); from the group consisting of the olefins, ethylene, propylene and 1,3-butadiene; from the group consisting of the vinyl halides, vinyl chloride, and styrene as the preferred vinylaromatic compound.

If desired, the copolymers according to the invention may also contain, as base monomers, up to 10% by weight, based on the copolymer, of ethylenically unsaturated, functional comonomers. Examples of these are mono- or dicarboxylic acids such as methacrylic acid, acrylic acid or fumaric acid, and amides thereof; hydroxyl-functional monomers such as hydroxyethyl acrylate, 2-hydroxypropyl acrylate or N-methylolacrylamide; sulpoonate-functional monomers such as vinyl sulphonate or 2-acrylamido-2-methylpropane sulphonate, and polyunsaturated monomers such as divinyl adipate.

Particular preference is given to copolymers containing one or more comonomers from the group consisting of vinyl acetate, isopropenyl acetate, vinyl propionate, vinyl laurate, vinyl chloride and/or ethylene, and one or more olefinically unsaturated peroxy compounds selected from the group consisting of the t-butylperoxy, t-amyl-peroxy and cumylperoxy monovinyl esters of malonic acid, succinic acid, glutaric acid and/or adipic acid. Greatest preference is given to copolymers containing from 0 to 50% by weight of ethylene, from 50 to 100% by weight of vinyl acetate and from 0.01 to 5% by weight of t-butylperoxy monovinyl adipate, the data in % by weight being based on the total weight of the copolymer and adding up to 100% by weight.

The peroxy group-containing copolymers are prepared by free-radical polymerization in bulk, in solution, in suspension or in emulsion. Of said processes, emulsion polymerization is the preferred variant. The polymerization can be carried out batchwise or continuously, with or without use of seed latices, with initial introduction of all or some constituents of the reaction mixture or with partial initial introduction and subsequent metering in of the or some constituents of the reaction mixture, or by the metering process without any initial introduction. All meterings are preferably carried out at the rate of consumption of the respective components.

The polymerization is initiated by free-radical formers in a temperature range of from 0° to 80° C., since significant decomposition if the peroxy groups in the copolymer occurs at higher temperature. The polymerization is preferably carried out at temperatures up to 70° C.

In the case of the preferred emulsion polymerization, the initiation is effected by means of water-soluble free-radical formers, which are preferably employed in amounts of from 0.01 to 3.0% by weight, based on the total weight of the monomers. Examples of these are ammonium and potassium persulphate and peroxodisulphate; hydrogen peroxide; and azo compounds such as azobisisobutyronitrile or azobiscyanovaleric acid. If the water-soluble free-radical former has a greater oxidation potential than the copolymerizable peroxide of the formula (I) or (II), for example in the case of t-butylhydroperoxide, potassium peroxodisulphate, sodium peroxodisulphate and ammonium peroxodisulphate, the formation of free radicals can be accelerated at lower temperatures with the aid of reducing agents.

Dispersants which can be employed are all emulsifiers and protective colloids usually used in emulsion polymerization. From 1 to 6% by weight, based on the total weight of the monomers, of emulsifier are preferably employed. Examples of suitable compounds are anionic tensides such as alkyl sulphates having a chain length of from 8 to 18 carbon atoms; alkyl and alkylaryl ether sulphates having 8 to 18 carbon atoms in the hydrophobic radical and up to 40 ethylene oxide or propylene oxide units; alkyl or alkylaryl sulphonates having 8 to 18 carbon atoms and esters and monoesters of sulphosuccinic acid with monohydric alcohols or alkylphenols. Examples of suitable non-ionic tensides are alkyl polyglycol ethers or alkylaryl polyglycol ethers having 8 to 40 ethylene oxide units.

If desired, protective colloids may be employed, preferably in amounts of up to 15% by weight, based on the total weight of the monomers. Examples of these are vinyl alcohol-vinyl acetate copolymers containing from 80% to 100 mol % of vinyl alcohol units, polyvinylpyrrolidones having a molecular weight of from 5000 to 400,000, and hydroxyethylcelluloses having a degree of substitution in the range of from 1.5 to 3.

The pH range desired for the polymerization, which is generally between 2.5 and 10, preferably between 3 and 8, may be established in a known manner by acids, bases or conventional buffer salts such as alkali metal phosphates or alkali metal carbonates. In order to adjust the molecular weight, the regulators usually used, for example mercaptans, aldehydes and chlorinated hydrocarbons, can be added during the polymerization.

The peroxide-containing copolymers are suitable as the graft base for the preparation of graft copolymers, block copolymers and core/shell dispersion particles having improved phase binding between the polymer phases.

The invention furthermore relates to graft copolymers prepared from a) a grafted-on polymer phase containing one or more monomers from the group consisting of (meth) acrylates of alcohols having 1 to 10 carbon atoms, vinyl esters of saturated aliphatic carboxylic acids having 2 to 10 carbon atoms, olefins, vinyl halides, styrene and styrene derivatives, and b) a peroxy group-containing copolymer phase containing from 0.01 to 20% by weight of the olefinically unsaturated peroxy compound according to the invention and from 80 to 99.9% by weight of one or more comonomers from the group consisting of the (meth)acrylates of alcohols having 1 to 10 carbon atoms, vinyl esters of saturated aliphatic carboxylic acid having 2 to 10 carbon atoms, olefins, vinylaromatic compounds, vinyl halides and/or vinyl ethers.

Preferred monomers of the graft monomer phase from the group consisting of (meth)acrylates of alcohols having 1 to 10 carbon atoms are methyl methacrylate, methyl acrylate, ethyl methacrylate, ethyl acrylate, isopropyl methacrylate, isopropyl acrylate, t-butyl acrylate, n-butyl acrylate and ethylhexyl acrylate. Preferred vinyl esters of saturated aliphatic carboxylic acids having 2 to 10 carbon atoms are vinyl acetate, vinyl propionate and vinyl laurate. Preferred olefins are ethylene and propylene. The preferred vinyl halide employed is vinyl chloride. Particular preference is given to styrene and methyl methacrylate. In addition, the graft monomer phase may, if desired, also contain up to 10% by weight, based on the graft monomer phase, of the above-mentioned ethylenically unsaturated, functional comonomers.

Preferred graft copolymers are those prepared from a graft base containing one or more comonomers from the group consisting of vinyl acetate, isopropenyl acetate, vinyl propionate, vinyl laurate, vinyl chloride and/or ethylene and containing from 0.01 to 10% by weight of one or more olefinically unsaturated peroxy compounds from the group consisting of t-butylperoxy, t-amylperoxy and cumylperoxy monovinyl esters of malonic acid, succinic acid, glutaric acid and/or adipic acid, and a grafted-on polymer phase made from (meth)acrylates of alcohols having 1 to 10 carbon atoms, vinyl esters of saturated aliphatic carboxylic acids having 2 to 10 carbon atoms, vinyl halides, styrene and/or styrene derivatives.

Particular preference is given to graft copolymers prepared from a graft base containing from 0 to 50% by weight of ethylene, from 50 to 100% by weight of vinyl acetate and from 0.01 to 5% by weight of t-butylperoxy monovinyl adipate, and a grafted-on polymer phase containing styrene or methyl methacrylate.

The grafting can be carried out in bulk, solution, suspension or emulsion. It is preferably carried out by the emulsion polymerization process. For the graft copolymerization, the peroxide-containing copolymer is initially introduced, preferably in the form of a seed latex. The graft monomer phase can be initially introduced or metered in, for example as a preemulsion. The amount of graft monomer added is adjusted so that between 1 and 99% by weight of these monomer units are present in the finished graft product.

The graft copolymerization is carried out at temperatures $\geq 80°$ C., preferably $\geq 90°$ C., without further addition of initiators, since the peroxide-containing copolymers, as macroinitiators, initiate the graft reaction. The graft copolymerization is preferably carried out with addition of from 0.1 to 5.0% by weight of emulsifier, based on the total weight of the graft copolymer.

The graft copolymer latex can be further worked up, for example by spray drying, roller drying or by coagulation with subsequent drying.

The graft copolymer latices are suitable for use as binders in the textiles sector (nonwovens), as heat stable binders, for example in coatings for roof sheeting, as adhesives in plasters and as binders in emulsion paints. Graft copolymer resins obtained by coagulation or spray drying are suitable as impact modifiers in plastics, as phase promoters in polymer blends, as low profile additives in UP resins and for use as thermoplastic elastomers.

The examples below serve to illustrate the invention in greater detail:

EXAMPLE 1

6.1 g (29.56 mmol) of dicyclohexylcarbodiimide were dissolved in 14 ml of diethyl ether in a 250 ml flask fitted with magnetic stirrer, dropping funnel and internal thermometer. 5.0 g (29.04 mmol) of monovinyl adipate were dissolved in 30 ml of diethyl ether and added slowly with vigorous stirring. After only a short time, a white, flocculant precipitate had formed. As soon as the addition of monovinyl adipate was complete, the mixture was cooled to below 5° C., and the resultant precipitate was dissolved by addition of 20 ml of dichloromethane. 4.4 g (29.04 mmol) of t-butyl hydroperoxide were then slowly added dropwise, and the batch was subsequently stirred for 5 hours at temperatures below 5° C. and left to stand overnight at low temperature. For work-up, the mixture was filtered through a suction filter. The residue was washed with a little dichloromethane, and the resultant clear solution was evaporated on a rotary evaporator, giving a clear liquid which decomposes at temperatures above 60° C.

$^1$H-NMR (CDCl$_3$): 1.320 ppm, s, 9H; 1.705 ppm, m, 4H; 2.394 ppm, m, 4H; 4.574 ppm, m, 1H; 4.877 ppm, m, 1H; 7.200 ppm, m, 1H.

EXAMPLE 2

Analogously to Example 1, 6.1 g (29.56 mmol) of dicyclohexylcarbodiimide were dissolved in 14 ml of diethyl ether in a 250 ml flask. 6.66 g (29.04 mmol) of monovinyl sebacate were dissolved in about 30 ml of diethyl ether and slowly added dropwise with vigorous stirring. The reaction was carried out precisely by the method described in Example 1, giving a clear liquid which solidifies at temperatures below 0° C. and decomposes above 60° C.

$^1$H-NMR (CDCl$_3$): 1.1–1.4 ppm, m, 17H, 1.51–1.73 ppm, m 4H, 2.36–2.51 ppm, m, 4H, 4.573 ppm, m, 1H, 4.879 ppm, m, 1H, 7.15–7.3 ppm, m, 1H.

EXAMPLE 3

Analogously to Example 1, 6.1 g (29.56 mmol) of dicyclohexylcarbodiimide were dissolved in 14 ml of diethyl ether in a 250 ml flask. 4.62 g (29.04 mmol) of monovinyl glutarate were dissolved in about 30 ml of diethyl ether and slowly added dropwise with vigorous stirring. The reaction was carried out precisely by the method described in Example 1, giving a clear liquid which decomposes at temperatures above 60° C.

$^1$H-NMR (CDCl$_3$): 1.32 ppm, s, 9H, 1.95–2.07 ppm, m, 2H, 2.43–2.56 ppm, m, 4H, 4.571 ppm, m, 1H, 4.875 ppm, m, 1H, 7.15–7.3 ppm, m, 1H.

EXAMPLE 4

First, four solutions were prepared: 1. Initiator solution: 0.45 part by weight of potassium persulphate was dissolved in 14.6 parts by weight of water. 2. Monomers: 0.4 part by weight of divinyl adipate was dissolved in 84.9 parts by weight of vinyl acetate. 3. Preemulsion: 0.8 part by weight of Na 2-acrylamido-2-methylpropanesulphonate and 2.2 parts by weight of a diisohexylsulphosuccinate (Aerosol MA 80 from Cyanamid) were emulsified in 40 parts by weight of water. 4. Peroxide solution: 1.95 parts by weight of t-butylperoxy monovinyl adipate (Example 1) were dissolved in 1.95 parts by weight of vinyl acetate.

9.75 parts by weight of vinyl acetate, 0.05 part by weight of divinyl adipate, 0.25 part by weight of vinyl sulphonate, 0.515 part by weight of diisohexylsulphosuccinate (Aerosol MA 80 from Cyanamid) and 0.125 part by weight of potassium persulphate were introduced into 87 parts by weight of water in a stirred autoclave, the mixture was warmed to 70° C., and the autoclave was charged with 80 bar of ethylene. When the temperature equilibrium had been reached, the above-described solutions 1 to 3 were metered in. The metering rates were selected to correspond to a metering time of 5 hours in the case of the monomers (2) and a metering time of 6 hours in the case of the initiator (1) and the preemulsion (3). When the metering of the monomers (2) was complete, the peroxide solution (4) was metered in over the course of one hour.

A finely dispersed dispersion having a solids content of 46% by weight and a monomodal particle size distribution, with the mean particle size being 168 nm, resulted. The copolymer had an ethylene content of 41% by weight and an active oxygen content of 0.085%. The glass transition temperature of the polymer resin (DSC) was −21° C., and its K value (measured in tetrahydrofuran, THF) was 40.1.

EXAMPLE 5

The procedure was analogous to Example 4, with the difference that t-butylperoxy monovinyl adipate was metered in together with the vinyl acetate phase over the entire reaction time. To this end, three solutions were prepared: 1. Initiator solution: 0.45 part by weight of potassium persulphate was dissolved in 14.6 parts by weight of water. 2. Monomers: 0.4 part by weight of divinyl adipate and 1.95 parts by weight of t-butylperoxy monovinyl adipate (Example 1) were dissolved in 86.8 parts by weight of vinyl acetate. 3. Preemulsion: 0.8 part by weight of Na 2-acrylamido-2-methylpropane-sulphonate and 2.2 parts by weight of a diisohexyl-sulphosuccinate (Aerosol MA 80 from Cyanamid) were emulsified in 40 parts by weight of water.

9.75 parts by weight of vinyl acetate, 0.05 part by weight of divinyl adipate, 0.25 part by weight of vinyl sulphonate, 0.515 part by weight of a diisohexylsulphosuccinate (Aerosol MA 80 from Cyanamid) and 0.125 part by weight of potassium persulphate were introduced into 87 parts by weight of water in a stirred autoclave, the mixture was warmed to 70° C., and the autoclave was charged with 80 bar of ethylene. When the temperature equilibrium had been reached, the above-described solutions 1 to 3 were metered in. The metering rates were selected to correspond to a metering time of 6 hours.

A finely dispersed dispersion having a solids content of 47.6% by weight and a monomodal particle size distribution, with the mean particle size being 179 nm, resulted. The copolymer had an ethylene content of 31% by weight and an active oxygen content of 0.226%. The glass transition temperature of the polymer resin (DSC) was −16° C., and its K value (measured in tetrahydrofuran, THF) was 40.3.

EXAMPLE 6

For the graft polymerization, 10 parts by weight of the peroxide group-containing copolymer from Example 4 in the form of a 6% strength aqueous dispersion were introduced into a polymerization reactor together with 0.005 part by weight of iron(II) ammoniumsulphate, the mixture was heated to 90° C., and a preemulsion comprising 89.55 parts by weight of styrene, 0.45 part by weight of acrylic acid and 2 parts by weight of Aerosol MA in 45 parts by weight of water was metered in with stirring over a period of 2 hours. When the metering was complete, the graft polymerization was completed at 93° C., giving a 39.5% strength polymer dispersion having a residual monomer content of 1.3% by weight and a mean particle size of 330 nm with a narrow, monomodal particle size distribution. The K value of the resin was 65.1, and the insoluble content in ethyl acetate was 29.7% by weight.

EXAMPLE 7

The procedure was analogous to Example 6, with the difference that 20 parts by weight of the peroxide group-containing copolymer from Example 5 were initially introduced in the form of an 11% strength aqueous dispersion, and 79.6 parts by weight of styrene, 0.4 part by weight of acrylic acid and 1.4 parts by weight of Aerosol MA in 40 parts by weight of water were metered in, giving a 42.6% strength polymer dispersion having a residual monomer content of 0.78% by weight and a mean particle size of 289 nm with a narrow, monomodal particle size distribution. The K value of the polymer resin was 61.1, and the insoluble content in ethyl acetate was 27.8% by weight.

EXAMPLE 8

The procedure was analogous to Example 6, with the difference that 90 parts by weight of the peroxide group-containing copolymer from Example 3 were initially introduced in the form of a 36% strength aqueous dispersion, and 9.95 parts by weight of styrene, 0.05 part by weight of acrylic acid and 0.1 part by weight of Aerosol MA in 5 parts by weight of water were metered in, giving a 43% strength polymer dispersion having a residual monomer content of 0.26% by weight and a mean particle size of 195 nm with a narrow, monomodal particle size distribution. The K value of the resin was 42.1.

COMPARATIVE EXAMPLE 1

A copolymer was prepared analogously to Example 5, but no t-butylperoxymonovinyl adipate was copolymerized. To this end, three solutions were prepared: 1. Initiator solution: 0.45 part by weight of potassium persulphate was dissolved in 14.6 parts by weight of water. 2. Monomers: 0.4 part by weight of divinyl adipate was dissolved in 88.8 parts by weight of vinyl acetate. 3. Preemulsion: 0.8 part by weight of Na 2-acrylamido-2-methylpropanesulphonate and 2.2 parts by weight of a diisohexylsulphosuccinate (Aerosol MA 80 from Cyanamid) were emulsified in 40 parts by weight of water.

9.75 parts by weight of vinyl acetate, 0.05 part by weight of divinyl adipate, 0.25 part by weight of vinyl sulphonate, 0.515 part by weight of a diisohexylsulphosuccinate (Aerosol MA 80 from Cyanamid) and 0.125 part by weight of potassium persulphate were introduced into 87 parts by weight of water in a stirred autoclave, the mixture was warmed to 70° C., and the autoclave was charged with 80 bar of ethylene. When the temperature equilibrium had been reached, the above-described solutions 1 to 3 were metered in. The metering rates were selected to correspond to a metering time of 6 hours.

A finely dispersed dispersion having a solids content of 43% by weight and a monomodal particle size distribution, the mean particle size being 178 nm, resulted. The copolymer had an ethylene content of 36% by weight and an active oxygen content of 0%. The glass transition temperature of the polymer resin (DSC) was −25.4° C., and its K value (measured in tetrahydrofuran, THF) was 39.4.

COMPARATIVE EXAMPLE 2

The procedure was analogous to Example 6, but the graft base initially introduced comprised 10 parts by weight of the copolymer from Comparative Example 1 in the form of a 6% strength dispersion. In order to initiate the graft reaction, an amount of initiator which was equivalent to the peroxide groups of the copolymer from Example 4, namely 0.516 part by weight of t-butylperoxy pivalate and 0.174 part by weight of t-butylperoxy 2-ethylhexanoate, was metered into the preemulsion together with 89.55 parts by weight of styrene, 0.45 part by weight of acrylic acid and 2.0 parts by weight of Aerosol MA in 40 parts by weight of water, giving a 41.8% strength polymer dispersion having a residual monomer content of 0.78% by weight and a mean particle size of 368 nm with a broad monomodal particle size distribution. The K value of the polymer resin was 50.2, and the insoluble content in ethyl acetate was 2.5% by weight.

COMPARATIVE EXAMPLE 3

The procedure was analogous to Example 7, but the graft base initially introduced comprised 20 parts by weight of the copolymer from Comparative Example 1 in the form of a 12% strength dispersion. In order to initiate the graft reaction, an amount of initiator which was equivalent to the peroxide groups of the copolymer from Example 5, namely 0.516 part by weight of t-butylperoxy pivalate and 0.174 part by weight of t-butylperoxy 2-ethylhexanoate, was metered into the preemulsion together with 79.6 parts by weight of styrene, 0.40 part by weight of acrylic acid and 1.40 parts by weight of Aerosol MA in 30 parts by weight of water, giving a 44.0% strength polymer dispersion having a residual monomer content of 0.57% by weight and a mean particle size of 310 nm with a narrow, monomodal particle size distribution. The K value of the polymer resin was 51.6, and the insoluble content in ethyl acetate was 8.8% by weight.

It is clear from Examples 6 and 7 and Comparative Examples 2 and 3 that the molecular weight (see K value) of the graft polymers in the case of grafting onto the peroxide-containing copolymers ("macroinitiators") was significantly increased. The ethyl acetate-insoluble content of the graft products is also significantly increased in the case of the peroxide-containing products and confirms the improved coupling of the polystyrene phase to the EVAc phase.

What is claimed is:

1. Graft copolymers having improved phase binding between a graft base and a grafted-on polymer phase, prepared from
   a) a grafted-on polymer phase containing one or more monomers selected from the group consisting of (meth)acrylates of alcohols having 1 to 10 carbon atoms, vinyl esters of saturated aliphatic carboxylic acids having 2 to 10 carbon atoms, olefins, vinyl halides, styrene and styrene derivatives, and
   b) a peroxy group-containing copolymer phase containing from 0.01 to 20% by weight of an olefinically unsaturated peroxy compound of the general formula I or II

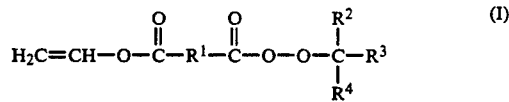

or

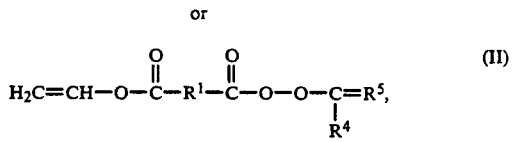

where $R^1$ is a single bond or a linear or branched alkyl chain having 1 to 10 carbon atoms or a cycloalkyl group having 3 to 10 carbon atoms, $R^2$ and $R^3$ are an alkyl group having 1 to 4 carbon atoms, $R^4$ is an alkyl group or an alkyl-substituted phenyl group having 1 to 12 carbon atoms or a cycloalkyl group having 3 to 12 carbon atoms, and $R^5$ is a cycloalkyl group having 3 to 12 carbon atoms and, from 80 to 99.9% by weight of at least one comonomer selected from the group consisting of the (meth)acrylates of selected alcohols having 1 to 10 carbon atoms, vinyl esters of saturated aliphatic carboxylic acids having 2 to 10 carbon atoms, olefins, vinylaromatic compounds, vinyl halides and vinyl ethers.

2. Graft copolymers according to claim 1, wherein $R^1$ is $(CH_2)_n$ where n=1,2,3,4 and 8, $R^2$ and $R^4$ are a methyl group, and $R^3$ is a methyl, ethyl or phenyl group.

3. Graft copolymers according to claim 1 or 2, wherein the grafted-on polymer phase a) contains styrene or methyl methacrylate, and the copolymer phase b) contains from 0 to 50% by weight of ethylene, from 50 to 100% by weight of vinyl acetate and from 0.01 to 5% by weight of t-butylperoxy monovinyl adipate.

* * * * *

UNITED STATES PATENT AND TRADEMARK OFFICE
CERTIFICATE OF CORRECTION

PATENT NO. : 5,304,609
DATED : April 19, 1994
INVENTOR(S) : Klaus Kohlhammer, et al It is certified that error appears in the above-identified patent and that said Letters Patent is hereby corrected as shown below:

On the title page
In item [22], the filing date should read --Oct. 28, 1992--.

Signed and Sealed this

Sixteenth Day of August, 1994

*Attest:*

BRUCE LEHMAN

*Attesting Officer*     *Commissioner of Patents and Trademarks*